United States Patent
Li et al.

(10) Patent No.: US 10,852,948 B2
(45) Date of Patent: Dec. 1, 2020

(54) SYSTEM AND METHOD FOR DATA ORGANIZATION IN SHINGLED MAGNETIC RECORDING DRIVE

(71) Applicant: Alibaba Group Holding Limited, Grand Cayman (KY)

(72) Inventors: Shu Li, Bothell, WA (US); Jianjian Huo, San Jose, CA (US)

(73) Assignee: Alibaba Group Holding, George Town (KY)

( * ) Notice: Subject to any disclaimer, the term of this patent is extended or adjusted under 35 U.S.C. 154(b) by 57 days.

(21) Appl. No.: 16/165,923

(22) Filed: Oct. 19, 2018

(65) Prior Publication Data

US 2020/0125268 A1 Apr. 23, 2020

(51) Int. Cl.
G06F 3/06 (2006.01)

(52) U.S. Cl.
CPC .......... *G06F 3/0608* (2013.01); *G06F 3/0659* (2013.01); *G06F 3/0676* (2013.01)

(58) Field of Classification Search
CPC ..... G06F 3/0608; G06F 3/0676; G06F 3/0659
See application file for complete search history.

(56) References Cited

U.S. PATENT DOCUMENTS

| | | |
|---|---|---|
| 4,775,932 A | 10/1988 | Oxley |
| 5,930,167 A | 7/1999 | Lee |
| 6,148,377 A | 11/2000 | Carter |
| 6,226,650 B1 | 5/2001 | Mahajan et al. |
| 7,565,454 B2 | 7/2009 | Zuberi |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |

(Continued)

FOREIGN PATENT DOCUMENTS

| | | |
|---|---|---|
| JP | 2003022209 | 1/2003 |
| JP | 2011175422 | 9/2011 |

(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Hiep T Nguyen
(74) *Attorney, Agent, or Firm* — Shun Yao; Park, Vaughan, Fleming & Dowler LLP

(57) ABSTRACT

One embodiment described herein provides a system for managing metadata for a shingled magnetic recording (SMR) drive. During operation, the system stores a metadata file in a memory of a host of the SMR drive; subsequent to the SMR drive performing a write operation, the system generates a metadata update, and sends the generated metadata update to a buffer associated with the SMR drive and the memory of the host. In response to a compaction condition being met, the system launches, in the memory of the host, a metadata compaction operation to generate a compacted metadata file based on the previously stored metadata file and the metadata update, and sends the compacted metadata file to the SMR drive.

20 Claims, 9 Drawing Sheets

(56) References Cited

U.S. PATENT DOCUMENTS

| | | |
|---|---|---|
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,751,763 B1 | 6/2014 | Ramarao |
| 8,825,937 B2 | 9/2014 | Atkisson |
| 9,043,545 B2 | 5/2015 | Kimmel |
| 9,088,300 B1 | 7/2015 | Chen |
| 9,092,223 B1 | 7/2015 | Pani |
| 9,280,472 B1 | 3/2016 | Dang |
| 9,280,487 B2 | 3/2016 | Candelaria |
| 9,436,595 B1 | 9/2016 | Benitez |
| 9,529,601 B1 | 12/2016 | Dharmadhikari |
| 9,588,698 B1 | 3/2017 | Karamcheti |
| 9,588,977 B1 | 3/2017 | Wang |
| 10,013,169 B2 | 7/2018 | Fisher |
| 10,229,735 B2 | 3/2019 | Natarajan |
| 10,235,198 B2 | 3/2019 | Qiu |
| 2002/0010783 A1 | 1/2002 | Primak |
| 2002/0073358 A1 | 6/2002 | Atkinson |
| 2002/0161890 A1 | 10/2002 | Chen |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0103238 A1 | 5/2004 | Avraham |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0034154 A1 | 2/2008 | Lee |
| 2008/0112238 A1 | 5/2008 | Kim |
| 2008/0301532 A1 | 12/2008 | Uchikawa |
| 2009/0113219 A1 | 4/2009 | Aharonov |
| 2009/0282275 A1 | 11/2009 | Yermalayeu |
| 2009/0307249 A1 | 12/2009 | Koifman |
| 2009/0310412 A1 | 12/2009 | Jang |
| 2010/0169470 A1 | 7/2010 | Takashige |
| 2010/0217952 A1 | 8/2010 | Iyer |
| 2010/0229224 A1 | 9/2010 | Etchegoyen |
| 2010/0325367 A1 | 12/2010 | Kornegay |
| 2011/0055458 A1 | 3/2011 | Kuehne |
| 2011/0055471 A1 | 3/2011 | Thatcher |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0292538 A1 | 12/2011 | Haga |
| 2011/0299317 A1 | 12/2011 | Shaeffer |
| 2011/0302353 A1 | 12/2011 | Confalonieri |
| 2012/0084523 A1 | 4/2012 | Littlefield |
| 2012/0117399 A1 | 5/2012 | Chan |
| 2012/0147021 A1 | 6/2012 | Cheng |
| 2012/0159289 A1 | 6/2012 | Piccirillo |
| 2012/0210095 A1 | 8/2012 | Nellans |
| 2012/0246392 A1 | 9/2012 | Cheon |
| 2012/0278579 A1 | 11/2012 | Goss |
| 2012/0284587 A1 | 11/2012 | Yu |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0166820 A1 | 6/2013 | Batwara |
| 2013/0173845 A1 | 7/2013 | Aslam |
| 2013/0191601 A1 | 7/2013 | Peterson |
| 2013/0219131 A1 | 8/2013 | Alexandron |
| 2013/0318283 A1 | 11/2013 | Small |
| 2014/0019650 A1 | 1/2014 | Li |
| 2014/0082273 A1 | 3/2014 | Segev |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1* | 9/2014 | Constantinescu ... G06F 16/1748 707/679 |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0142752 A1 | 5/2015 | Chennamsetty |
| 2015/0227316 A1 | 8/2015 | Warfield |
| 2015/0277937 A1 | 10/2015 | Swanson |
| 2015/0301964 A1 | 10/2015 | Brinicombe |
| 2015/0304108 A1 | 10/2015 | Obukhov |
| 2015/0363271 A1 | 12/2015 | Haustein |
| 2015/0372597 A1 | 12/2015 | Luo |
| 2016/0014039 A1 | 1/2016 | Reddy |
| 2016/0026575 A1 | 1/2016 | Samanta |
| 2016/0048341 A1* | 2/2016 | Constantinescu .... G11B 27/032 711/111 |
| 2016/0098344 A1 | 4/2016 | Gorobets |
| 2016/0110254 A1 | 4/2016 | Cronie |
| 2016/0162187 A1 | 6/2016 | Lee |
| 2016/0179399 A1 | 6/2016 | Melik-Martirosian |
| 2016/0203000 A1 | 7/2016 | Parmar |
| 2016/0232103 A1 | 8/2016 | Schmisseur |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1* | 12/2016 | Kuttner ................. G06F 3/0631 |
| 2017/0010652 A1 | 1/2017 | Huang |
| 2017/0075583 A1 | 3/2017 | Alexander |
| 2017/0075594 A1 | 3/2017 | Badam |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0212708 A1 | 7/2017 | Suhas |
| 2017/0228157 A1 | 8/2017 | Yang |
| 2017/0249162 A1 | 8/2017 | Tsirkin |
| 2017/0262178 A1 | 9/2017 | Hashimoto |
| 2017/0285976 A1 | 10/2017 | Durham |
| 2017/0286311 A1 | 10/2017 | Juenemann |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0088867 A1 | 3/2018 | Kaminaga |
| 2018/0107591 A1 | 4/2018 | Smith |
| 2018/0143780 A1 | 5/2018 | Cho |
| 2018/0167268 A1 | 6/2018 | Liguori |
| 2018/0189182 A1 | 7/2018 | Wang |
| 2018/0212951 A1 | 7/2018 | Goodrum |
| 2018/0270110 A1 | 9/2018 | Chugtu |
| 2018/0293014 A1 | 10/2018 | Ravimohan |
| 2018/0329776 A1 | 11/2018 | Lai |
| 2018/0356992 A1 | 12/2018 | Lamberts |
| 2018/0373428 A1 | 12/2018 | Kan |

(56) References Cited

U.S. PATENT DOCUMENTS

| | | | |
|---|---|---|---|
| 2019/0012111 A1 | 1/2019 | Li | |
| 2019/0073262 A1 | 3/2019 | Chen | |
| 2019/0205206 A1 | 7/2019 | Hornung | |

FOREIGN PATENT DOCUMENTS

| | | |
|---|---|---|
| WO | 9418634 | 8/1994 |
| WO | 1994018634 | 8/1994 |

OTHER PUBLICATIONS

Tsuchiya, Yoshihiro et al. "DBLK: Deduplication for Primary Block Storage", MSST 2011, Denver, CO, May 23-27, 2011 pp. 1-5.
Chen Feng, et al. "CAFTL: A Content-Aware Flash Translation Layer Enhancing the Lifespan of Flash Memory based Solid State Devices"< FAST '11, San Jose, CA Feb. 15-17, 2011, pp. 1-14.
Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.
WOW: Wise Ordering for Writes—Combining Spatial and Temporal Locality in Non-Volatile Caches by Gill (Year: 2005).
Helen H. W. Chan et al. "HashKV: Enabling Efficient Updated in KV Storage via Hashing", https://www.usenix.org/conference/atc18/presentation/chan, (Year: 2018).
Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.
EMC Powerpath Load Balancing and Failover Comparison with native MPIO operating system solutions. Feb. 2011.
S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.
Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

* cited by examiner

SYSTEM AND METHOD FOR DATA ORGANIZATION IN SHINGLED MAGNETIC RECORDING DRIVE

BACKGROUND

Field

This disclosure is generally related to data storage devices and systems implementing the shingled magnetic recording technology. More specifically, this disclosure is related to a method and system that improves the performance of shingled magnetic recording hard disk drives.

Related Art

Shingled magnetic recording (SMR) is a magnetic storage data recording technology used in hard disk drives (HDDs) to increase storage density and overall per-drive storage capacity. Conventional hard disk drives record data by writing non-overlapping magnetic tracks parallel to each other (perpendicular recording), while shingled recording writes new tracks that overlap part of the previously written magnetic track, leaving the previous track narrower and allowing for higher track density. Thus, the tracks partially overlap similar to roof shingles.

Due to their low cost and high area density, SMR drives are gaining popularity. SMR drives can be characterized with sequential write requirements for the entire band that stores 256 MB data in general. However, the metadata (a set of data that describes and gives information about other data, which may include the mapping between the logical and physical addresses) of the HDD does not follow the sequential trend, and can be updated frequently at random addresses. This poses a challenge for SMR HDD performance.

SUMMARY

One embodiment described herein provides a system for managing metadata for a shingled magnetic recording (SMR) drive. During operation, the system stores a metadata file in a memory of a host of the SMR drive; subsequent to the SMR drive performing a write operation, the system generates a metadata update, and sends the generated metadata update to a buffer associated with the SMR drive and the memory of the host. In response to a compaction condition being met, the system launches, in the memory of the host, a metadata compaction operation to generate a compacted metadata file based on the previously stored metadata file and the metadata update, and sends the compacted metadata file to the SMR drive.

In a variation on this embodiment, the compaction condition comprises one or more of: an occurrence of a timeout event, a size of the metadata update exceeding a predetermined threshold, and receiving a command from the host of the SMR drive.

In a variation on this embodiment, the stored metadata file can include a log file, and generating the metadata update can include generating a log entry.

In a further variation, the log file is append only.

In a variation on this embodiment, the system further creates, by a file system associated with the SMR drive, a logical extent corresponding to a data bucket; maps the logical extent to a physical extent on the SMR drive; and saves the mapping between the logical extent and the physical extent in the metadata update.

In a further variation, the physical extent corresponds to a continuous physical space on the SMR drive.

In a further variation, the continuous physical space is aligned to an SMR zone.

In a variation on this embodiment, the metadata compaction operation can include multiple incremental compacting operations.

In a variation on this embodiment, the system can further write the metadata update stored in the buffer to a flash drive associated with the SMR drive, in response to detecting a power loss.

In a further variation, in response to detecting a power recovery, the system can further write the metadata update stored in the flash drive back to the buffer, and loads the compacted metadata file stored on the SMR drive to the memory of the host.

One embodiment can provide a shingled magnetic recording (SMR)-based data storage system. The data storage system can include an SMR drive, a host server comprising a memory configured to store a metadata file associated with the SMR drive, and a buffer associated with the SMR drive. The buffer is configured to store updates to the metadata file. The memory of the host server is configured to, in response to a compaction condition being met, launch a metadata compaction operation to generate a compacted metadata file based on the previously stored metadata file and the updates to the metadata file. The SMR drive is configured to receive and store the compacted metadata file.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of improving the performance of SMR HDDs by implementing a novel user-space file system with a simplified metadata structure. The novel user-space file system can be held temporarily by an HDD data buffer and secured by the internal mechanism of HDD. More specifically, the mapping table of the HDD can be maintained in the memory of the host system and updates of the metadata can be sequentially written in the HDD buffer. Metadata can also be compacted and flushed into the HDD after accumulation of changes. To reduce the size of the mapping, the novel file system defines logical extents of relatively large sizes, and forms physical extents corresponding to those logical extents by allocating a continuous physical location on the SMR drive for each physical extent. Moreover, the physical extent can be aligned with the SMR zone to eliminate the need for garbage collection. The mapping table between logical and physical extents can be created in an append-only manner to achieve low-latency in table creation.

SMR Basics

Figure 1:
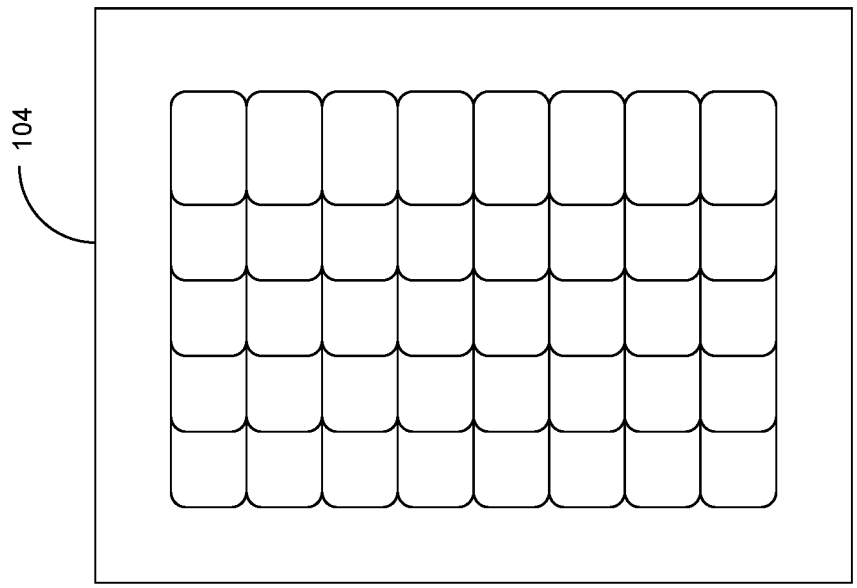
FIG. 1 illustrates the structures of a conventional hard disk and a shingled magnetic recording (SMR) hard disk.
Figure 1:
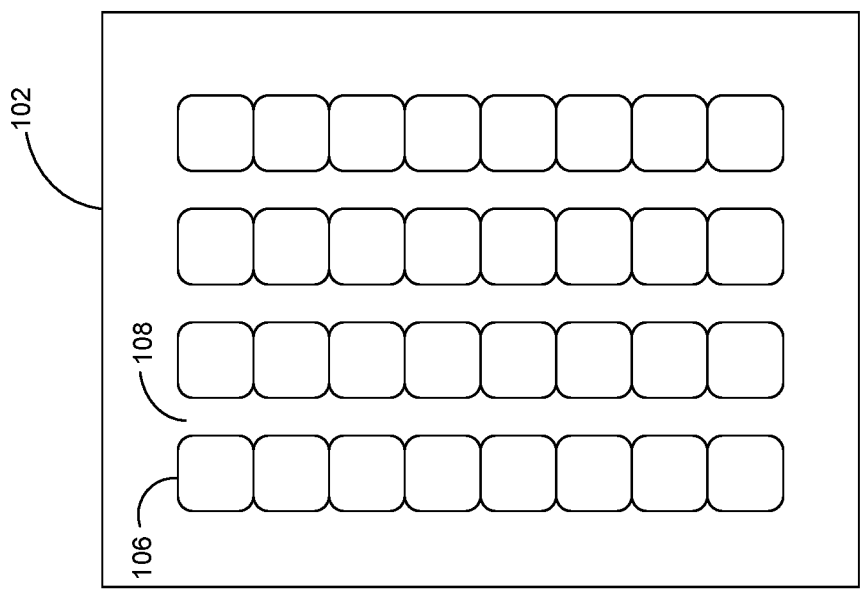

FIG. 1 illustrates the structures of a conventional hard disk and a shingled magnetic recording (SMR) hard disk. More specifically, the left drawing shows the structure of a conventional hard disk 102, and the right drawing shows the structure of an SMR hard disk 104. Conventional hard disk 102 can have sectors (e.g., sector 106) of equal sizes sitting in line on a track, and there is a gap (e.g., gap 108) between adjacent tracks. These gaps are considered a waste of space. On the other hand, SMR hard disk 104 enables higher track density by allowing adjacent tracks to overlap one another, eliminating the gap between adjacent tracks.

Figure 2:
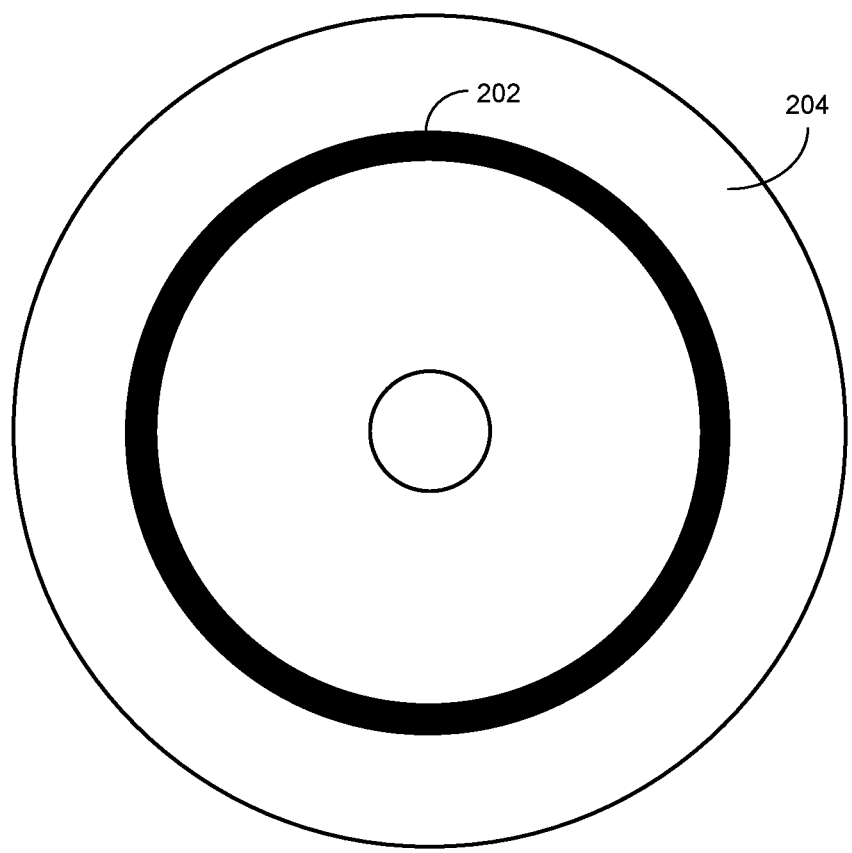
FIG. 2 shows an SMR HDD with a CMR region (prior art).

However, the overlapped track structure of the SMR hard disk is optimized for large sequential read/write operations and not suitable for any type of random write data, such as the metadata of the hard disk drive (HDD). The metadata can be updated frequently at random addresses, making their storage on the SMR HDD a challenge. In order to handle the storage of the metadata of the SMR HDD, current approaches can involve allocating one region on the HDD platter that is configured in the conventional magnetic recording (CMR) manner instead of SMR. FIG. 2 shows an SMR HDD with a CMR region (prior art). In the example shown in FIG. 2, CMR region 202 can be located in the middle of SMR platter 204. Unlike other regions in SMR platter 204, tracks in CMR region 202 do not overlap. As a result, CMR region 202 can provide random write performance close to that of a conventional HDD. CMR region 202 can be used for storage of metadata only.

There are shortcomings in such approaches. First, the separation between the regular data storage region and the metadata storage region means that, when writing the metadata and regular data, the disk write head may need to move to different regions, thus increasing latency by inserting the seek time. Second, the specially designed CMR region can decrease the overall areal density of the HDD. Moreover, as shown in FIG. 2, the CMR region residing in the middle of the HDD platter can affect the configuration flexibility of the platter. During the HDD usage, it may be beneficial to reconfigure various regions of the HDD. However, the existence of the CMR region can make reconfiguring the HDD difficult.

Novel File System

To improve the performance of the SMR drive, in some embodiments, the system maintains the mapping table of the HDD in the memory of the host server to avoid frequent lookup of the HDD platter. At the same time, updates to the metadata can be sequentially written (e.g., in the form of entries in a log file) into the HDD buffer. Such updates can accumulate in the HDD buffer until they reach a predetermined amount. In response to changes to the metadata accumulated in the HDD buffer reaching the threshold amount, the host server can launch, from its memory, metadata compaction, and flush the compacted metadata into the HDD.

Figure 3:
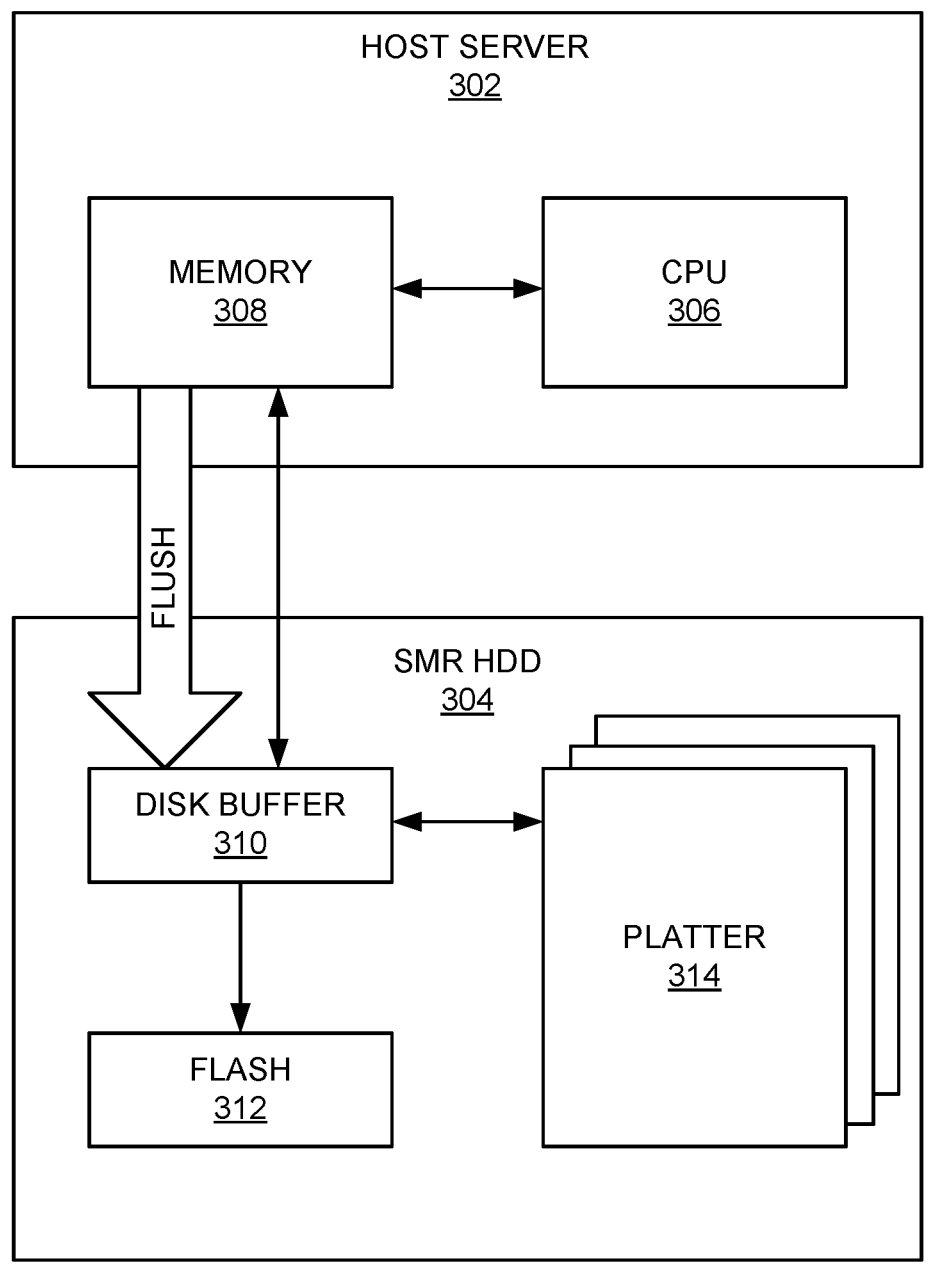
FIG. 3 illustrates exemplary system architecture, according to one embodiment.

FIG. 3 illustrates exemplary system architecture, according to one embodiment. Data storage system 300 can include a host server 302 and an SMR HDD module 304. Host server 302 can include a central processing unit (CPU) 306 and a memory 308. CPU 306 can include multiple cores. Memory 308 can be a dynamic random-access memory (DRAM), such as a DRAM dual-line memory module (DIMM).

SMR HDD module 304 can include a disk buffer 310, a flash drive 312, and one or more SMR platters (e.g., platter 314). Disk buffer 310 can be an embedded memory included in HDD module 304 and can sometimes be referred to as a disk cache. Disk buffer 310 typically can temporarily store data before they are actually stored on platters. Access to data in disk buffer 310 is much faster than accessing data in the platters.

During initial write operations, in addition to sequentially writing data along with the metadata into a corresponding zone in the HDD platters, the system also maintains a copy of the metadata (e.g., mapping information between logical and physical extents) in memory 308 of host server 302. During read operations, metadata lookup can be performed in memory 308, which allows efficient random access. There is no need to access the HDD platters for metadata lookup. To reduce latency, the metadata can be in the form of a log file, also referred to as the metadata journal.

During subsequent operations, new data can be stored onto or old data can be removed from the HDD platters; consequently, the HDD metadata needs to be updated. In some embodiments, updates to the HDD metadata can be recorded in the form of entries appended to the metadata log file. The metadata updates can be stored in disk buffer 310. More specifically, each write or delete operation can be recorded as one entry appended to the journal. Updates to the metadata (i.e., journal entries) accumulate in disk buffer 310 until a threshold amount is reached. Note that disk buffer 310 typically has a relatively small size (e.g., few megabytes). In some embodiments, the threshold amount can be between a few hundred KB (e.g., 256 KB) and a few MB.

Once the metadata updates accumulated in disk buffer 310 reach the threshold amount, memory 308 can launch metadata compaction. Metadata compaction refers to the process of removing redundant entries in the metadata journal in order to reduce the size of the metadata. In addition to reaching the threshold amounts, other conditions may also trigger the metadata compaction. In some embodiments, the metadata compaction can also be triggered by a timeout event or by receiving a host command. For example, if the metadata has not been updated for a predetermined time, memory 308 can launch the metadata compaction. Moreover, certain system configuration commands can also result in memory 308 launching the metadata compaction. In some embodiments, the metadata journal can be incrementally compacted. For example, a portion of the journal entries can be placed into a compaction box and compacted to form a compacted box. Subsequently, the compacted box along with a plurality of additional journal entries can be compacted together to form a final compacted box. This final compacted box includes the compacted version of the metadata and will be written into the HDD platters (e.g., platter 314).

After final compaction, the compacted metadata can be flushed into the HDD platters (e.g., platter 314) for permanent storage. This version provides a snapshot of metadata, as the metadata updates frequently. Disk buffer 310 only stores later entries (i.e., entries after compaction) of the metadata and ensures that the later changes to the metadata can be securely written to the HDD. On the other hand, host memory 308 stores both the compacted metadata as well as those later entries for future compaction. More specifically, the metadata compaction occurs within host memory 308.

Flash drive 312 can provide secure storage of updates to the metadata in the event of power loss. More specifically, when power loss occurs, the remaining kinetic energy from the rotating HDD platters can be used to write metadata updates stored in disk buffer 310 into flash drive 312. Once power returns, those metadata updates can be transferred back, from flash drive 312, to host memory 308 and disk buffer 310. In some embodiments, SMR module 304 can include a generator (not shown in FIG. 3) which can be driven by the rotating HDD platters after power loss to create charge, which can then be used to write metadata updates stored in disk buffer 310 into flash drive 312. When power recovers, a previous version metadata can be loaded to the host memory from the platter, and new updates to the metadata can be recovered from flash drive 312. In some embodiments, in response to the recovery of power from a power loss event, metadata updates stored in flash drive 312 can be sent back to disk buffer 310, thus facilitating normal operations of the SMR drive 304.

Figure 4:
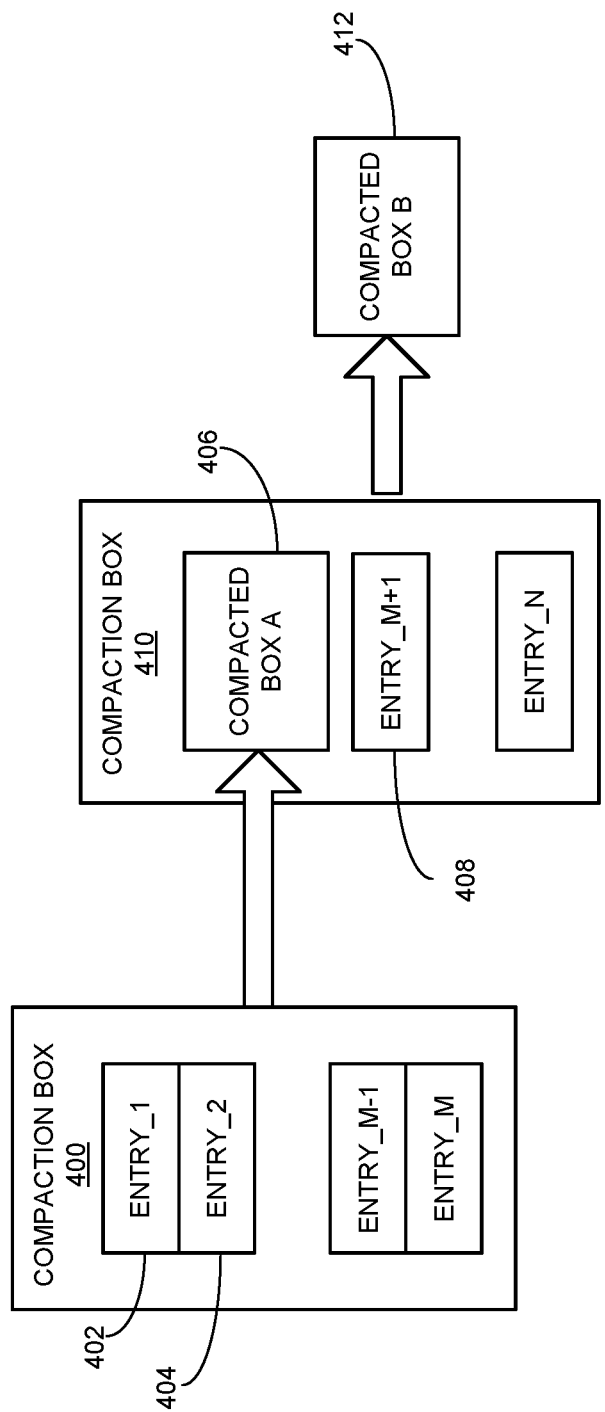
FIG. 4 illustrates an exemplary scenario of metadata compaction, according to one embodiment.

FIG. 4 illustrates an exemplary scenario of metadata compaction, according to one embodiment. In FIG. 4, a number of metadata journal entries (e.g., entries 402 and 404) can be placed into a compaction box 400, which can be configured to perform a compaction operation. Note that, due to the limited processing capability of the compaction operation, compaction box 400 can only accommodate a limited number of journal entries, meaning that each compaction operation can only handle a limited number of journal entries. The compaction operation can involve removing redundancy (e.g., duplicated entries) in the metadata journal. Moreover, the compaction operation can also involve removing a journal entry when the corresponding physical extent has been released. After the initial compaction, entries in compaction box 400 can produce a simplified version, represented by compacted box 406.

Subsequently, the already compacted entries in compacted box 406 and additional metadata journal entries (e.g., entry 408) can be placed into compaction box 410. The number of additional metadata entries that can be accommodated within compaction box 410 can depend on the size of compacted box 406. Compacted box 406 and the additional entries can then be compacted again to form a final compacted box 412. Note that, although compacted box 406 includes journal entries that have been previously compacted, there is still the possibility of redundancy between those entries and the additional entries. In the example shown in FIG. 4, two compaction operations are needed to achieve a final compacted version of the metadata. Depending on the size of the accumulated metadata updates, more or fewer compactions may be needed.

As discussed previously, the size of the disk buffer is limited, thus limiting the size of the metadata. In some embodiments, a novel file system is implemented in the SMR in order to reduce the size of the metadata. More specifically, the novel file system can define a plurality of logical extents, each having a relatively large size (e.g., 256 MB). Each logical extent can be mapped to a physical extent, which corresponds to a contiguous region on the disk platter. This design can result in a lightweight file system. For example, if the SMR drive has a size of 12 TB and each physical extent can be indexed using 8 bytes, the size of the mapping table can be around 384 KB. Such a mapping table can be easily stored in the host memory or the disk buffer. In some embodiments, one SMR zone can be chosen as one physical extent, and the entire SMR drive can be formatted into a number of physical extents. The alignment between physical extents and SMR zones eliminates the need for garbage collection.

Figure 5:
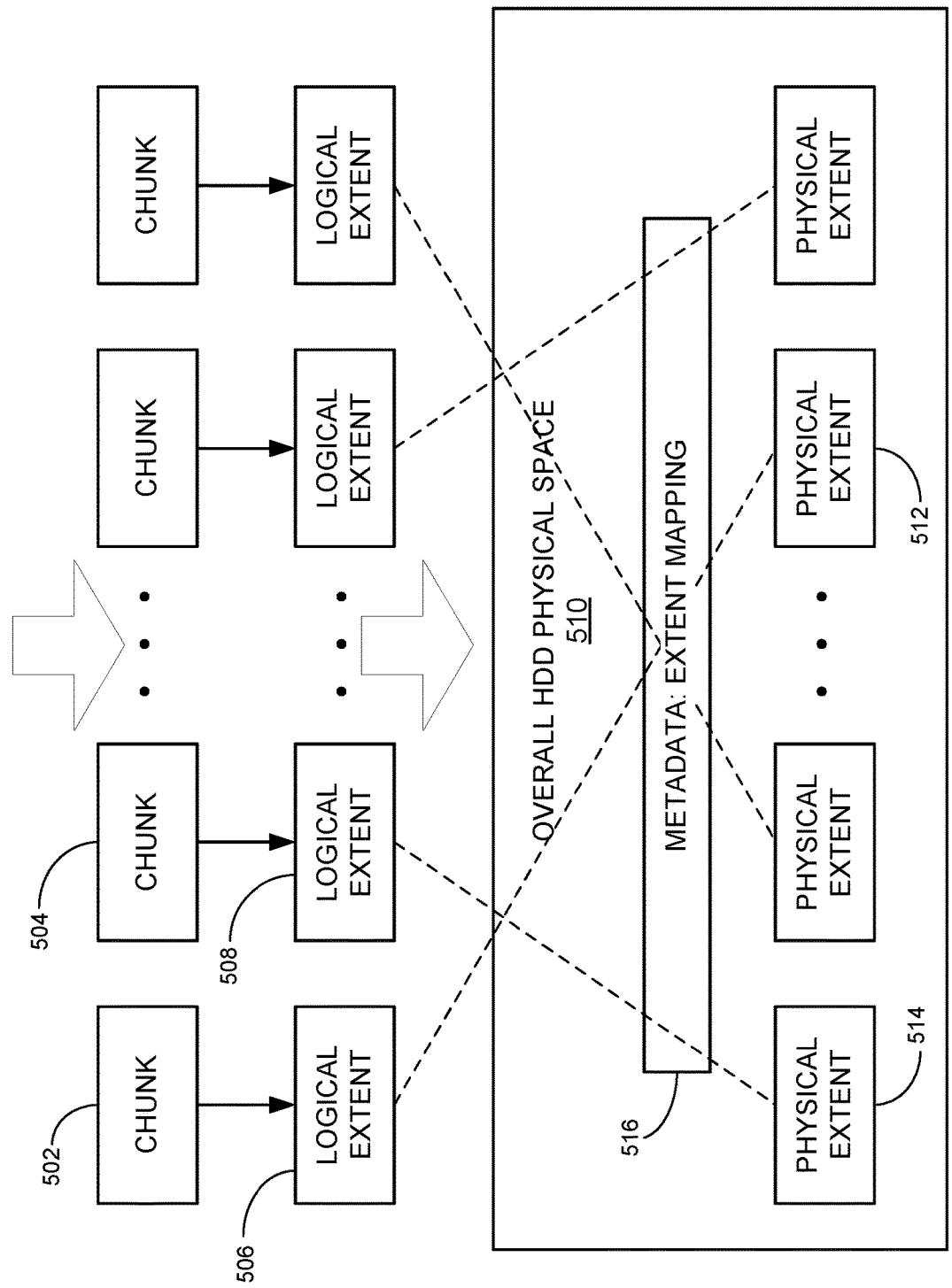
FIG. 5 shows the exemplary mapping between logical extents and physical extents for an SMR system, according to one embodiment.

FIG. 5 shows the exemplary mapping between logical extents and physical extents for an SMR system, according to one embodiment. In FIG. 5, to-be-written data, which can include data from multiple clients, can be placed into data buckets, also referred to as chunks, such as chunks 502 and 504. This process usually happens at the host server. At the host server, each chunk corresponds to a logical extent in the file system. For example, chunk 502 corresponds to logical extent 506, and chunk 504 corresponds to logical extent 508. Each time a data bucket is created, the file system creates one logical extent. The logical extents can be mapped to physical locations within HDD physical space 510. More specifically, the file system can locate a piece of contiguous physical location (e.g., an SMR zone) on the SMR platter to form a physical extent. In other words, the file system creates a mapping between a contiguous physical location on the SMR platter and the logical extent. For example, logical extent 506 can be mapped to physical extent (or a contiguous physical location) 512, and logical extent 508 can be mapped to physical extent (or a contiguous physical location) 514. The mapping between the logical extents and physical extents can be recorded as metadata 516.

Data can be written into the SMR drive using the extent (logical or physical) as a unit. Similarly, data is deleted from the SMR drive using the extent as a unit. Each time a logical extent is created and mapped to a physical extent, the mapping is recorded as an entry in the mapping table (e.g., metadata 516). In some embodiments, the metadata 516 can be in the form of a journal, and the extent-processing instructions (e.g., creation and deletion of logical extents) can be recorded as entries of the journal. In further embodiments, to achieve the low-latency recording of the metadata, the journal is configured to be appended only.

As disclosed previously, changes to the metadata (i.e., appended entries to the journal) can be maintained at the disk buffer of the SMR. In fact, after a piece of data has been written into a physical extent, and after the corresponding journal entry is written to the disk buffer of the SMR drive, the piece of data can be acknowledged as write done.

Figure 6:
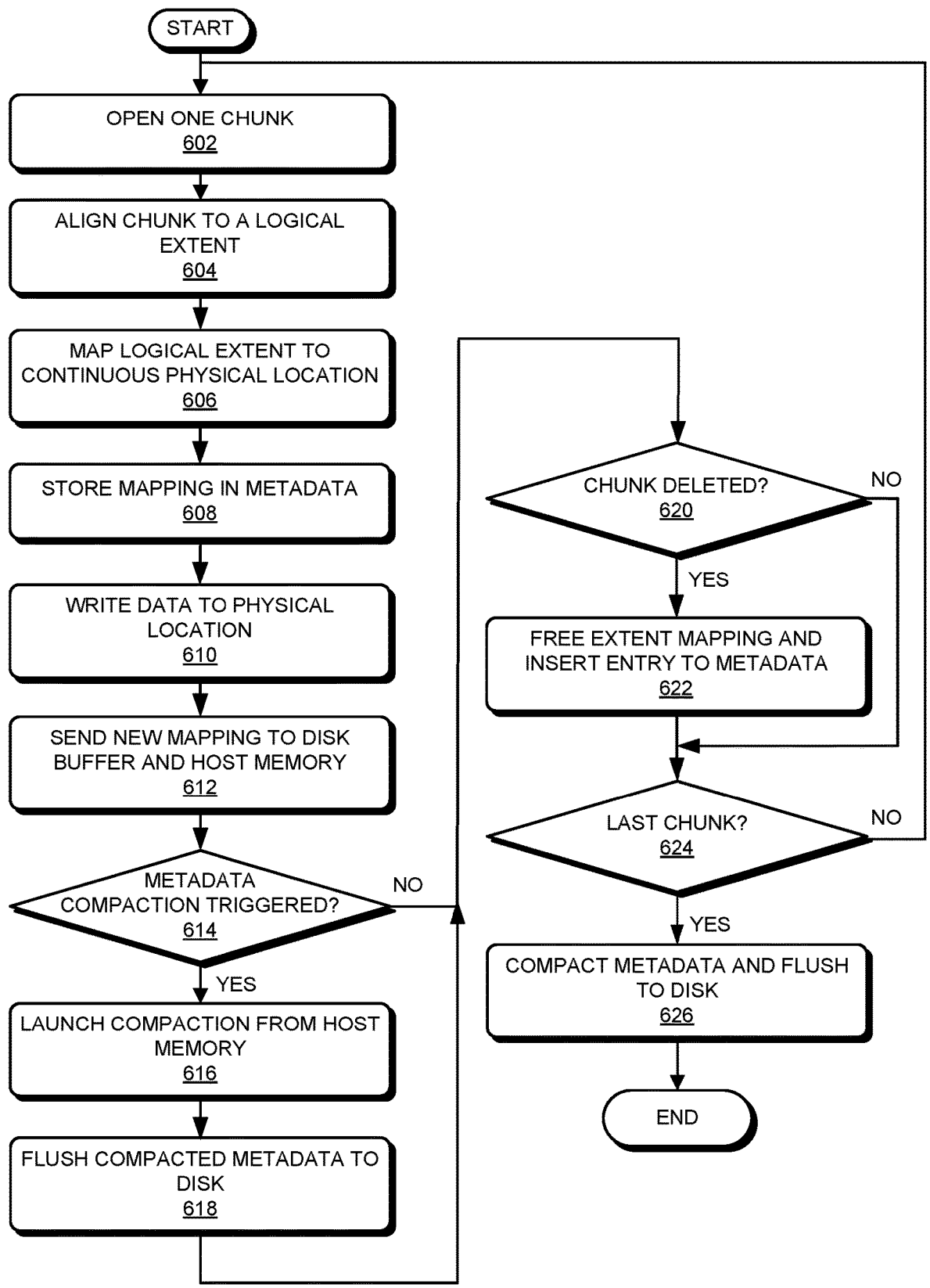
FIG. 6 presents a flowchart illustrating an exemplary process for writing data to an SMR drive, according to one embodiment.

FIG. 6 presents a flowchart illustrating an exemplary process for writing data to an SMR drive, according to one embodiment. During operation, the storage system can open one chunk to be filled with client files (operation 602). In some embodiments, the storage system can include a distributed storage system, which can store data on a plurality of servers. The storage system can align the chunk to a logical extent at each local server (operation 604). The system can map the logical extent to a continuous physical location on the SMR drive for writing the client files (operation 606). The mappings, including the mapping between the chunk and the logical extent and the mapping between the logical extent and the continuous physical location, can be recorded in the metadata file (operation 608). In some embodiments, the metadata file can be in the format of an append-only journal, and the mappings can be written as entries in the metadata journal.

The storage system can then write the data sequentially onto the mapped physical location on the disk platter (operation 610) and send the new mapping information to the disk buffer of the SMR as well as the memory of the host server (operation 612). Once the new mapping information is sent to the disk buffer, the file system can acknowledge the data as write done. In some embodiments, the new mapping information can be appended metadata journal entries. Subsequent to updating the metadata file in the memory of the host server, the system determines whether the metadata compaction is triggered (operation 614). Various types of event can trigger the metadata compaction. In some embodiments, the metadata compaction can be triggered by the size of the metadata file reaching a threshold value, the occurrence of a timeout event, receiving a compaction command from the server, etc. For example, the metadata compaction can be triggered in response to the new journal entries written into the disk buffer exceeding a predetermined size, such as 50% of the disk buffer. Alternatively, the metadata compaction can occur periodically.

In response to the metadata compaction being triggered, the system can launch, from the memory of the host server, the compaction of the metadata to obtain a simplified version of the metadata (operation 616). In some embodiments, the compaction of the metadata may be performed incrementally (e.g., multiple rounds of compaction can be performed). The compaction of the metadata can include removing the duplicated entries and removing entries associated with deleted data). As a result of the compaction operation, the size of the metadata file is reduced.

Subsequent to compacting the metadata, the host memory can flush the compacted metadata to the SMR disk for permanent storage (operation 618). In some embodiments, the compacted metadata can be written onto the SMR disk platter in a sequential manner.

If no metadata compaction is triggered, the storage system can determine whether a chunk has been deleted (operation 620). If so, the system can free the extent mapping and this delete entry can be inserted into the metadata journal (operation 622). For example, after chunk 502 shown in FIG. 5 is deleted, the mapping between chunk 502 and logical extent 506 and the mapping between logical extent 506 and physical extent 512 can be freed (e.g., the corresponding rows in the extent mapping table can be freed), and physical extent 512 can be immediately overwritten for storing a new chunk. If the chunk is not a deleted chunk, the system then determines if it is the last chunk (operation 624). If so, the storage system compacts the metadata and flushes the compacted metadata onto the disk (operation 626). Otherwise, the storage system opens a new chunk for writing data (operation 602).

Figure 7:
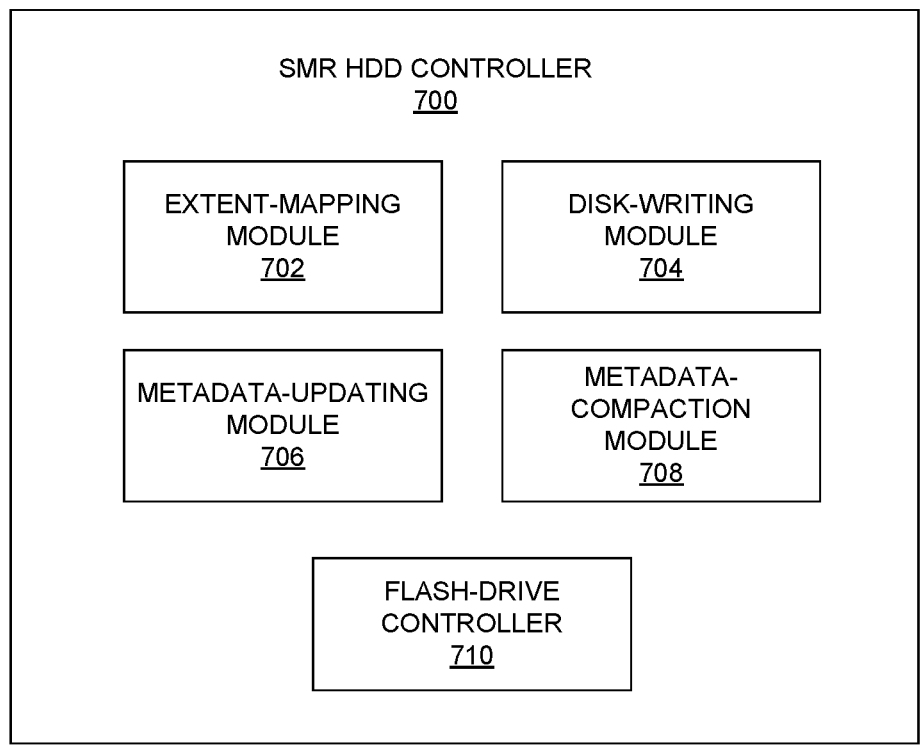
FIG. 7 provides a diagram illustrating an exemplary SMR HDD controller, according to one embodiment.

FIG. 7 provides a diagram illustrating an exemplary SMR HDD controller, according to one embodiment. SMR HDD controller 700 can include an extent-mapping module 702 for mapping logical extents to physical extents. More specifically, one physical extent can have a relatively large size (e.g., 256 MB), and can occupy an entire SMR zone. Note that aligning the physical extents with the SMR zones eliminates the need for garbage collection. SMR HDD controller 700 can also include a disk-writing module 704 for writing data to the SMR platter and a metadata-updating module 706 for updating the SMR HDD metadata. More specifically, metadata-updating module 706 can send the metadata update (e.g., in form of a journal entry) to the HDD buffer. In the mean time, metadata-updating module 706 can also update the metadata stored in the host memory. SMR HDD controller 700 can further include a metadata-compaction module 708 configured to compact the metadata in response to detecting a compaction condition being met. As discussed previously, the compaction condition can include a time-out condition or file size condition.

Moreover, the compaction condition can also include receiving a direct command from the host server. The compacted metadata can be written, by disk-writing module 704, onto the disk platter for permanent storage. In some embodiments, the compacted metadata can be stored at the beginning or ending portion of an SMR zone. SMR HDD controller 700 can also include a flash-drive controller 710 configured to control the write and read operations of a flash drive. More specifically, when a power loss is detected, flash-drive controller 710 can control the write operation of the metadata updates stored in the HDD buffer to the flash drive. When power is restored, flash-drive controller 710 can control the read operation of the metadata updates stored in the flash drive to the HDD buffer and the host.

Figure 8:
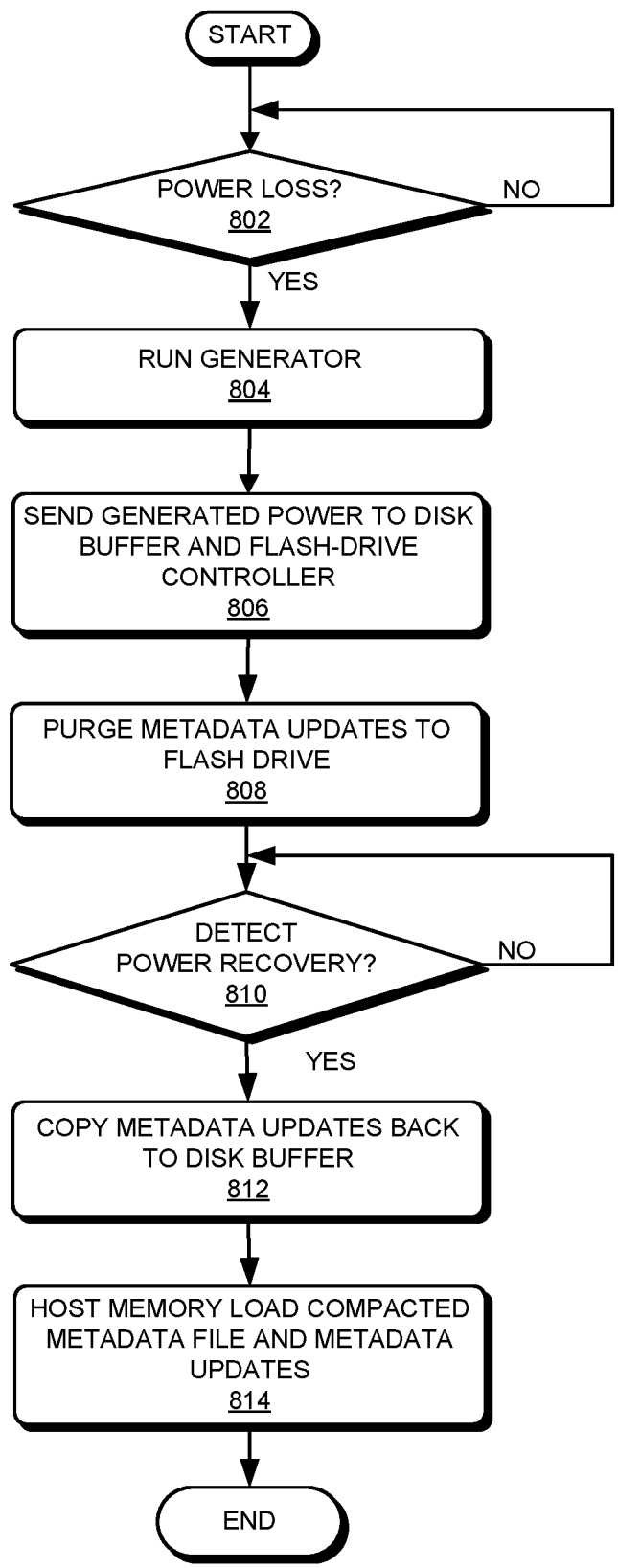
FIG. 8 presents a flowchart illustrating the process of backing up the metadata update in the event of a power loss, according to one embodiment.

FIG. 8 presents a flowchart illustrating the process of backing up the metadata update in the event of a power loss, according to one embodiment. During operation, the system monitors the power provided to the system (e.g., the SMR drive) to detect a power loss (operation 802). In response to detecting a power loss, the system runs a generator (operation 804). More specifically, the generator uses the remaining kinetic energy of the rotating platter to generate power. The generated power can be sent to the disk buffer as well as the flash-drive controller (operation 806). The disk buffer can then use the received power to send its contents, more particularly the currently stored metadata updates, to the flash drive (operation 808).

After sending the recent metadata updates to the flash drive, the system waits for the recovery of power (operation 810). In response to detecting the power recovery, the flash-drive controller can copy metadata updates stored in the flash drive back to the disk buffer (operation 812). Moreover, the host memory can load a previously compacted metadata file from the disk platter as well as the recent metadata updates from the disk buffer (operation 814).

In general, embodiments of the present invention provide a method and system that implements lightweight mapping to organize the data buckets with the physical extents of the SMR drive to simplify the metadata and to utilize the SMR drive's sequential operation advantage. Per logic data bucket configuration, the SMR drive can be configured so that the SMR zone size is the same as the size of the logic data bucket, thereby accelerating the data sequential write and recycling. This prevents the write head's frequent move to switch between writing metadata and data. Moreover, the small-size metadata can be stored in any SMR region (typically in the beginning or ending of an SMR zone). It is no longer necessary to maintain a CMR region in the SMR drive. The metadata is mainly operated (e.g., read, append, and compaction) in the host memory instead of the HDD to provide the low-latency access. The metadata can also be periodically compacted and flushed to the SMR drive platter for persistent storage. The compacted version of the metadata file provides a snapshot of the metadata.

Figure 9:
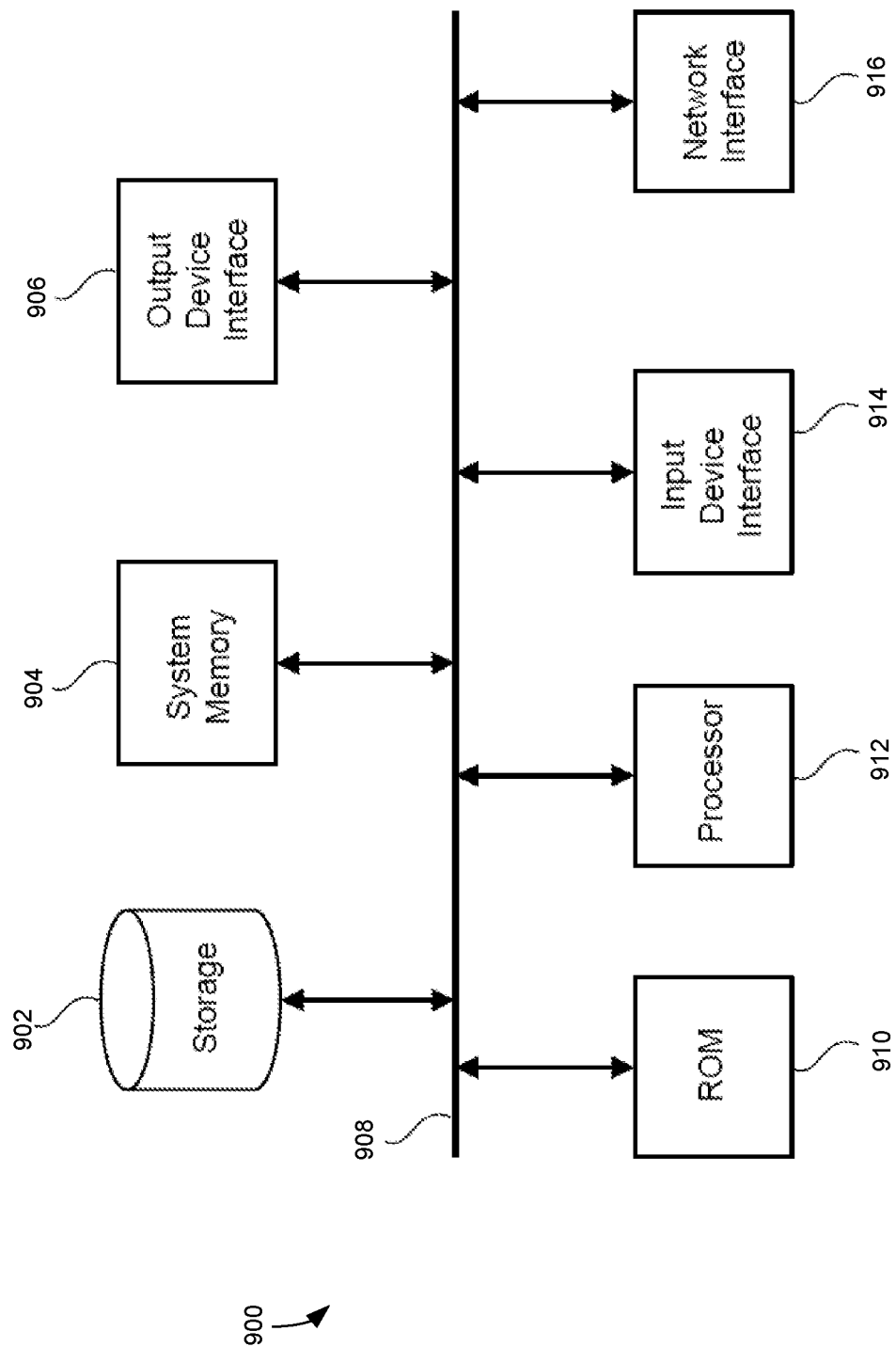
FIG. 9 conceptually illustrates an electronic system with which some implementations of the subject technology are implemented.

FIG. 9 conceptually illustrates an electronic system with which some implementations of the subject technology are implemented. Electronic system 900 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 900 includes a bus 908, processing unit(s) 912, a system memory 904, a read-only memory (ROM) 910, a permanent storage device 902, an input device interface 914, an output device interface 906, and a network interface 916.

Bus 908 collectively represents all system, peripheral, and chipset buses that communicatively connect the numerous internal devices of electronic system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of the electronic system. Permanent storage device 902, on the other hand, is a read-and-write memory device. This device is a non-volatile memory unit that stores instructions and data even when electronic system 900 is off. Some implementations of the subject disclosure use a mass-storage device (such as a magnetic or optical disk and its corresponding disk drive) as permanent storage device 902.

Other implementations use a removable storage device (such as a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such as a random-access memory. System memory 904 stores some of the instructions and data that the processor needs at runtime. In some implementations, the processes of the subject disclosure are stored in system memory 904, permanent storage device 902, and/or ROM 910. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and send commands to the electronic system. Input devices used with input device interface 914 include, for example, alphanumeric keyboards and pointing devices (also called "cursor control devices"). Output device interface 906 enables, for example, the display of images generated by the electronic system 900. Output devices used with output device interface 906 include, for example, printers and display devices, such as cathode ray tubes (CRT) or liquid crystal displays (LCD). Some implementations include devices such as a touchscreen that function as both input and output devices.

Finally, as shown in FIG. 9, bus 908 also couples electronic system 900 to a network (not shown) through a network interface 916. In this manner, the computer can be a part of a network of computers (such as a local area network ("LAN"), a wide area network ("WAN"), or an intranet, or a network of networks, such as the Internet. Any or all components of electronic system 900 can be used in conjunction with the subject disclosure.

These functions described above can be implemented in digital electronic circuitry, or in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for managing metadata for a shingled magnetic recording (SMR) drive, the method comprising:
storing a metadata file in a memory of a host of the SMR drive;
subsequent to the SMR drive performing a write operation, generating a metadata update;
sending the generated metadata update to a buffer located on the SMR drive and the memory of the host;
in response to a compaction condition being met, launching, by the memory of the host, a metadata compaction operation to generate a compacted metadata file based on the previously stored metadata file and the metadata update; and
sending the compacted metadata file to the SMR drive.

2. The computer-implemented method of claim 1, wherein the compaction condition comprises one or more of:
an occurrence of a timeout event;
a size of the metadata update exceeding a predetermined threshold; and
receiving a command from the host of the SMR drive.

3. The computer-implemented method of claim 1, wherein the stored metadata file comprises a log file, and wherein generating the metadata update comprises generating a log entry.

4. The computer-implemented method of claim 3, wherein the generated log entry is appended to the log file.

5. The computer-implemented method of claim 1, further comprising:
creating, by a file system associated with the SMR drive, a logical extent corresponding to a data bucket;
mapping the logical extent to a physical extent on the SMR drive; and
saving the mapping between the logical extent and the physical extent in the metadata update.

6. The computer-implemented method of claim 5, wherein the physical extent corresponds to a continuous physical space on the SMR drive.

7. The computer-implemented method of claim 6, wherein the continuous physical space is aligned to an SMR zone.

8. The computer-implemented method of claim 1, wherein the metadata compaction operation comprises multiple incremental compacting operations.

9. The computer-implemented method of claim 1, further comprising:
in response to detecting a power loss, writing the metadata update stored in the buffer to a flash drive associated with the SMR drive.

10. The computer-implemented method of claim 9, further comprising:

in response to detecting a power recovery, writing the metadata update stored in the flash drive back to the buffer; and loading the compacted metadata file stored on the SMR drive to the memory of the host.

11. A shingled magnetic recording (SMR)-based data storage system, comprising:

an SMR drive;

a host server comprising a memory configured to store a metadata file associated with the SMR drive; and a buffer located on the SMR drive, wherein the buffer is configured to store updates to the metadata file;

wherein the memory of the host server is configured to, in response to a compaction condition being met, launch a metadata compaction operation to generate a compacted metadata file based on the previously stored metadata file and the updates to the metadata file; and wherein the SMR drive is configured to receive and store the compacted metadata file.

12. The data storage system of claim 11, wherein the compaction condition comprises one or more of:

an occurrence of a timeout event;

a size of the metadata update exceeding a predetermined threshold; and receiving a command from the host of the SMR drive.

13. The data storage system of claim 11, wherein the stored metadata file comprises a log file, and wherein the metadata updates comprise log entries.

14. The data storage system of claim 13, wherein the generated log entry is appended to the log file.

15. The data storage system of claim 11, further comprising:

a file system associated with the SMR drive configured to:
create a logical extent corresponding to a data bucket;
map the logical extent to a physical extent on the SMR drive; and
save the mapping between the logical extent and the physical extent in the updates to the metadata file.

16. The data storage system of claim 15, wherein the physical extent corresponds to a continuous physical space on the SMR drive.

17. The data storage system of claim 16, wherein the continuous physical space is aligned to an SMR zone.

18. The data storage system of claim 11, wherein the metadata compaction operation comprises multiple incremental compacting operations.

19. The data storage system of claim 11, further comprising:

a flash drive associated with the SMR drive; and a metadata backup module configured to, in response to detecting a power loss, back up the updates to the metadata file stored in the buffer to the flash drive.

20. The data storage system of claim 19, wherein the metadata backup module is further configured to:

in response to detecting a power recovery, write the updates to the metadata file stored in the flash drive back to the buffer; and load the compacted metadata file stored on the SMR drive to the memory of the host.

* * * * *